United States Patent [19]

Buzzell et al.

[11] 4,291,582

[45] Sep. 29, 1981

[54] MASS RATE OF FLOW METER WITH PHASE SHIFT COMPENSATION

[75] Inventors: Colby E. Buzzell, Wilmington; Malcolm H. Allen, Jr., Melrose, both of Mass.

[73] Assignee: General Electric Company, Wilmington, Mass.

[21] Appl. No.: 84,398

[22] Filed: Oct. 12, 1979

[51] Int. Cl.³ ............................................ G01F 1/80
[52] U.S. Cl. ............................................ 73/861.35
[58] Field of Search .......... 73/861.03, 861.35, 861.36; 324/174, 179; 310/155, 168; 336/73, 110

[56] References Cited

U.S. PATENT DOCUMENTS

| 3,164,017 | 1/1965 | Karlby et al. | 73/861.36 |
| 3,393,388 | 7/1968 | Young | 336/84 |
| 3,722,279 | 3/1973 | Jablonski | 73/861.35 |
| 3,876,927 | 4/1975 | Gee | 310/155 |
| 4,056,976 | 11/1977 | Hildebrand et al. | 73/861.35 |

*Primary Examiner*—Herbert Goldstein
*Attorney, Agent, or Firm*—I. David Blumenfeld

[57] ABSTRACT

A mass rate of flow meter with a first magnet and a sensing coil assembly for detecting the passage of an unrestrained rotor past the sensing coil assembly. The sensing coil assembly includes a coil wound on a copper coil form that provides phase shifts to start signals from the sensing coil assembly at low speeds to compensate phase shifts that are produced in a second coil assembly that generates stop pulses.

12 Claims, 6 Drawing Figures

MASS RATE OF FLOW METER WITH PHASE SHIFT COMPENSATION

BACKGROUND OF THE INVENTION

This invention relates to mass rate of flow meters of the angular momentum type having a swirl generator for imparting swirl to the measured fluid stream and a torque balance reaction generator for removing the imparted swirl. More particularly, this invention relates to such a meter having an improved readout system for indicating the mass rate of flow.

This invention is particularly adapted for use in a mass rate of flow meter which utilizes a spring-restrained turbine as the torque balance reaction generator. One such mass rate of flow meter is depicted in U.S. Pat. No. 4,056,976 issued Nov. 8, 1977 and titled Mass Rate of Flow Meter, which patent is assigned to the same assignee as the present invention. This meter includes a housing that defines a fluid passage that extends along a longitudinal axis through the housing and that has an input port and an output port located on the axis. A swirl generator is located adjacent the input port to impart a substantially constant angular velocity to an entering fluid stream. As the fluid leaves the swirl generator, it passes through an axially displaced, unrestrained rotor that rotates about the axis. The angular velocity of the rotor accurately represents the angular velocity of the fluid stream as it leaves the rotor and passes through an axially spaced, spring-restrained turbine. The angular momentum of the fluid stream angularly displaces the turbine about the axis and against the bias of its restraining spring. Under steady state conditions, this deflection of the turbine is proportional to the mass rate of flow.

In a spring-restrained flow meter, the rotor carries two circumferentially and longitudinally displaced bar magnets. The first magnet is disposed on the input end of the rotor and is circumferentially poled. A first sensing coil assembly in a transverse plane through the first magnet is radially spaced from the magnet and isolated from the fluid flow. Each time the first magnet passes the first sensing coil, it induces a "start" pulse in the coil that indicates the passage of a predetermined point on the rotor past a predetermined point on the housing.

The second magnet is at the exit end of the rotor and diametrically opposed to the first magnet. An axially disposed, longitudinally extending bar of a highly permeable material, such as soft iron, mounts on the periphery of the turbine. The axial spacing between the rotor and the turbine interposes an axial air gap between the bar and the second magnet when they align. A second sensing coil assembly, that is isolated from the fuel flow, is coaxial with and longitudinally coextensive with the second magnet and the bar. Each time the second magnet passes the bar, the flux that the bar couples to the second sensing coil assembly changes and induces a "stop" pulse in the second sensing coil. As described in the foregoing U.S. Pat. No. 4,056,976, timing circuits convert the start and stop pulses from the first and second sensing coil assemblies into an indication of the mass rate of flow through the meter.

In this type of flowmeter, the unrestrained rotor rotates at different angular velocities. In some applications, the range is from one revolution per second up to and exceeding six revolutions per second. Rotor speeds below four revolutions per second are considered to be low rotor speeds. During various tests, it has been found that at low rotor speeds the indicated rate of flow is less than the actual rate of flow through the flowmeter.

This error, in part, arises because the relative timing of the start and stop pulses produced in the sensing coils is dependent, in part, upon rotor speed. This dependence can adversely affect the flow indicator because the timing circuits respond to negative-going zero crossings of the start and stop pulses. Specifically, it has been found that flux changes that produce the stop pulses also induce eddy currents in the aluminium housing. These eddy currents shift the phase of the stop pulses without a corresponding shift in the phase of the start pulses. Consequently, the measured time interval between the start and stop pulses is dependent upon both fuel flow and rotor speed. As a result, at low flow rates the flowmeter can indicate a flow rate that is less than the actual flow rate. cl SUMMARY Therefore, it is an object of this invention to provide an improved mass rate of flow meter with a reliable readout system.

Another object of this invention is to provide an improved mass rate of flow meter which provides reliable indications of mass flow at low speeds of the unrestrained rotor.

In accordance with this invention, the above objects are achieved by improving a sensor that detects the passage of a predetermined point on the rotor past a predetermined point on the housing and from which successive start pulses indicate rotor speed. More specifically, this indicator includes a magnet on the periphery of the rotor and a coil that is wrapped about a coil support on the housing. The coil support is composed of a nonmagnetic, electrically conductive material that acts as a shorted turn and shifts the phase of the start pulses to compensate the phase shift in the stop signals produced at low rotor speeds.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
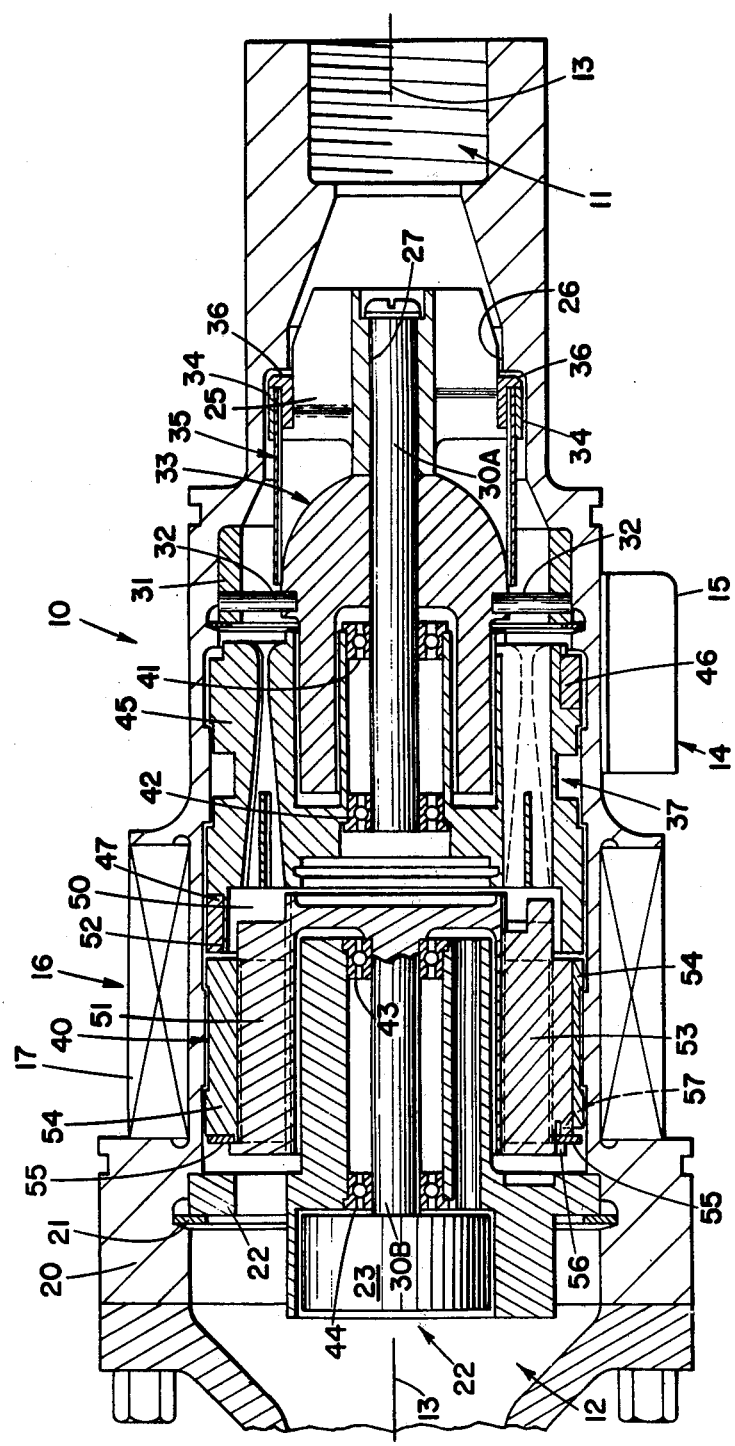
FIG. 1 is a longitudinal view, in cross-section, of a mass rate of flow meter embodying this invention.

FIG. 1 illustrates an exemplary flowmeter that incorporates this invention. It comprises a housing 10 having an inlet port 11 and an outlet port 12 at the ends of the housing 10 which, with other elements of the flowmeter, defines a generally annular passage for a fluid, such as aircraft fuel. The passage is generally disposed along a longitudinal axis 13. A first sensing coil assembly 14 generates first timing, or start, pulses and is affixed to the housing 10. The assembly 14 has a longitudinal axis that is perpendicular to the axis 13 and is secured in a shield 15.

A second sensing coil assembly 16 generates second, or stop, timing pulses and is also affixed to the housing 10. The assembly 16 has a longitudinal axis that is coincident with the axis 13 and includes a sensing coil 17 that is disposed at a flange 20 at the outlet port 12. Conductors from both the first sensing coil assembly 14 and the second sensing coil assembly 16 terminate at a connector assembly (not shown). Both the coil assemblies 14 and 16 are isolated from the flow of a fluid through the housing 10.

A first inner, or turbine, assembly is radially positioned on the housing 10 by a housing end flange 20 and an end assembly 22 and is axially positioned by a retaining ring 21. The end assembly 22 also supports a spring mechanism 23. At the inlet port 11, a second inner, or rotor, assembly includes a flow straightener 24 that comprises a plurality of longitudinally extending, circumferentially spaced vanes 25. The flow straightener 24 is positioned in a tapered bore 26 and is mounted to one end of a shaft 30A. An aligned shaft 30B is supported by the end assembly 22 and lies on the longitudinal axis 13.

A forward strut element in the rotor assembly comprises a stationary annulus 31 and a plurality of struts 32 that extend inwardly from the annulus 31 and that support a swirl generator 33. The annulus 31 radially positions the rotor assembly and coacts with a retaining ring 31A to axially position the rotor assembly on the housing 10. The swirl generator 33 supports the shaft 30A. A flanged ring 34 is carried on the outer surface of the vanes 25 and supports one end of a variable diameter conduit 35 that includes a plurality of spring fingers that encircle the swirl generator 33. The conduit 35 acts as a flow responsive valve. A second ring 36 clamps the conduit 35 and the ring 34 to the vanes 25. This ring 36 also coacts with the housing 10 to radially position the shaft 30A.

A rotor 37 and a turbine 40 are journaled on shafts 30A and 30B respectively in an axially spaced relationship. Thrust bearings 41 and 42 support and position the rotor 37 on the shaft 30A; thrust bearings 43 and 44, the turbine 40 on the shaft 30B. A flat band, helical spring (not shown) in the spring mechanism 23 is clamped between the turbine 40 and the shaft 30B to restrain rotation of the turbine 40 about the shaft 30B.

An outer annulus 45 on the rotor 37 supports a group of permanent bar magnets 46 in the periphery of the rotor 37. These magnets are disposed to produce a north-south magnetic axis along a chord near the periphery of the rotor 37. Each time the magnets 46 rotate past the sensing coil assembly 14, a start pulse is induced in the coil assembly 14 that indicates the passage of a predetermined point on the rotor 37 (i.e., the location of the magnets 46) past a predetermined point on the housing 10 (i.e., the location of the coil assembly 14).

Another group of permanent magnets 47 also mounts to the outer annulus 45 of the rotor 37. More specifically, the annulus 45 has an annular extension 50 that extends toward and overlaps a portion of the turbine, specifically the ends of turbine blades 51 on the turbine. Longitudinal grooves 52 are cut in the outer surface of the extension 50 to carry longitudinally extending, closely spaced, radially poled magnets 47. These magnets 47 also produce a field with a north-south magnetic axis lying along a chord near the periphery of the rotor 37.

In addition to the turbine blades 51, the turbine 40 carries an exciter blade 53 of a permeable material and a diametrically opposed, non-permeable, balancing blade (not shown). An outer band, or shroud, 54 fits over the turbine blade 51, the exciter blade 53, and the balancing blade. The band 54 engages a flux collecting ring 55 of a permeable material between the band 54 and a radial extension 56 on the turbine 40. The ring 55 bears against a tab 57 from the exciter blade 53 and a similar tab from the balancing blade.

Each time the magnets 47 pass the exciter blade 53, flux linkages are coupled to the coil 17 through the exciter blade 53 and the flux collection ring 55 and induce an electrical stop pulse in the sensing coil 17 that indicates the passage of another predetermined point on the rotor 37 (i.e., the location of the magnet 47) past a predetermined point on the turbine (i.e., the position of the exciter blade 53). The time between the start and stop pulses is representative of flow rate.

Figure 2:
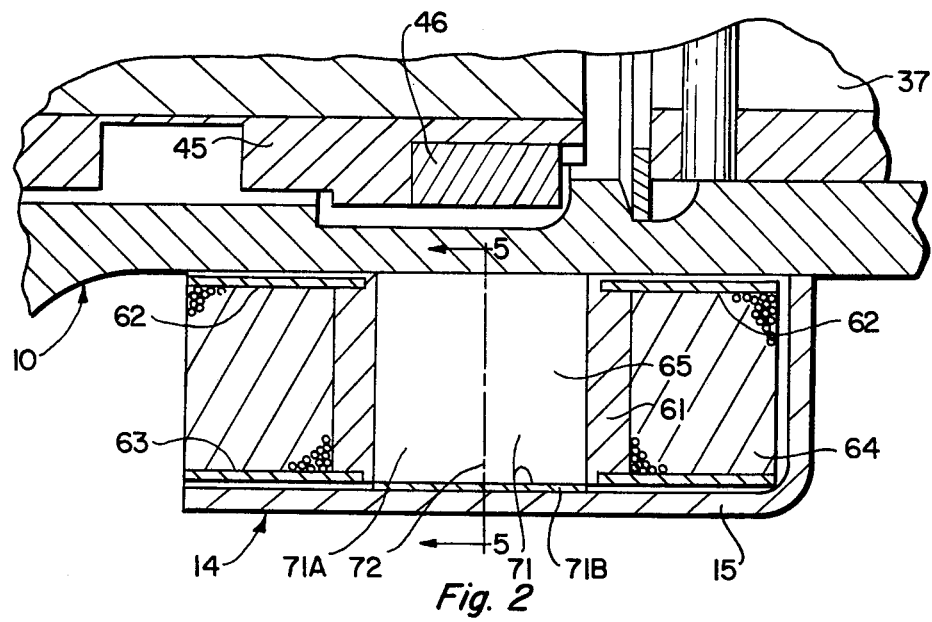
FIG. 2 is an enlarged cross-sectional view of a portion of a sensor that is shown is FIG. 1.

FIG. 2 depicts a portion of the rotor 37 and the housing 10 at the first sensing coil assembly 14. The magnets 46 on the annulus 45 are positioned adjacent to the sensing coil assembly 14. The shield 15 is composed of highly magnetically permeable material and mounts around the coil assembly 14 thereby to magnetically shield the coil assembly from electromagnetic interference. It is affixed to the housing 10. There is also mounted to the housing 10 a coil form assembly 60 including a coil form core 61 and end plates 62 and 63. A sensing coil 64 wraps around the coil form core 61 between the end plates 62 and 63.

Figure 3:
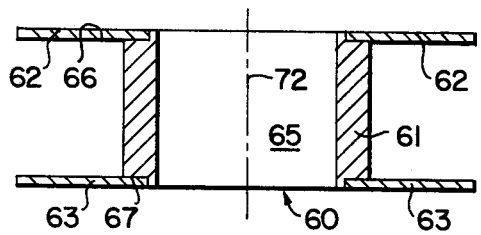
FIG. 3 is a cross-sectional view of a coil form that is depicted in FIG. 2.
Figure 4:
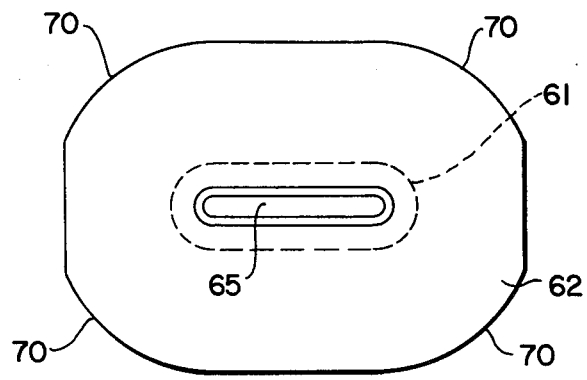
FIG. 4 is a top view of the coil form of FIG. 3.

Referring to FIGS. 3 and 4, the coil form core 61 has an oblong shape, thereby to define an oblong slot 65 vertically through the coil form core 61. The walls of the coil form core 61 have upper and lower recesses 66 and 67 that accept and position the end plates 62 and 63. As shown more specifically in FIG. 4, the end plate 62 is generally rectangular with radiused corners 70. As is most readily seen in FIG. 3, the end plates 62 and 63 thereby nest onto the coil form core 61.

Figure 5:
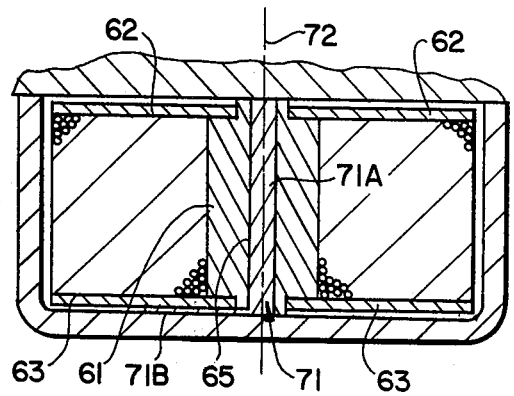
FIG. 5 is a sectional view taken along lines 5—5 in FIG. 2.

Referring to FIGS. 2 and 5, the coil assembly 14 additionally includes a magnetic core 71 that reduces the reluctance of the magnetic current associated with the magnets 46. This magnetic core 71 is L-shaped. One leg 71A is disposed in the oblong slot 65 through the hollow coil form core 61. The free end of the leg 71A abuts the housing 10. The other leg 71B extends between and is in contact with the lower end plate 63 and the magnetic shield 15.

The coil form core 61 and end plates 62 and 63 are composed of copper. Thus they constitute a coil form assembly 60 that electrically is a shorted turn. Referring again to FIG. 2, the coil form assembly 60 is positioned with a longitudinal axis 72 through the coil form 60 lying in a plane that is transverse to the longitudinal axis 13 and that intersects the magnets 46 that are centered longitudinally on the axis 72.

Figure 6:
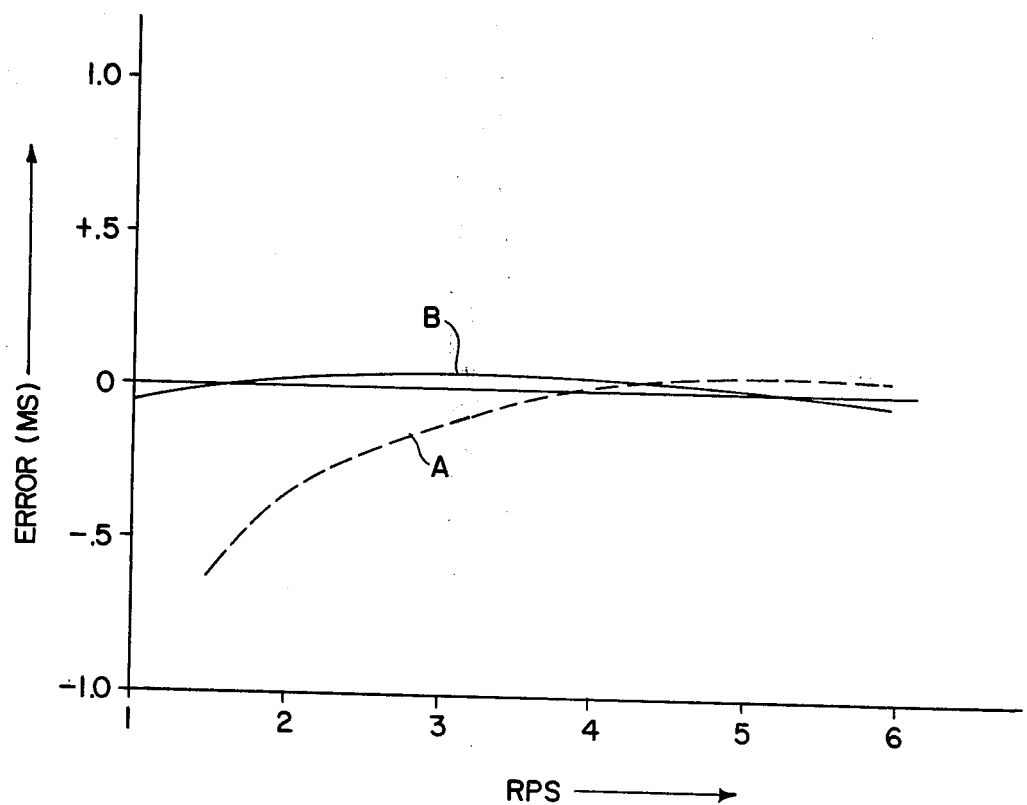
FIG. 6 is a graph that depicts the improved operating results achieved with this invention.

During operation of the flowmeter, eddy currents induced in the housing 10 produce the phase shift in the signals from the coil assembly 16 at low rotor speeds. Without the copper coil form assembly 60 shown in FIG. 2, the dashed Graph A in FIG. 6 results. As can be seen, the timing error increases as the rotor speed decreases. This means that the flowmeter indicates a flow rate that is less than the actual flow rate. Graph B in FIG. 6 depicts the error that exists when the copper coil form assembly 60 of FIGS. 3 and 4 is utilized. It can be seen that the addition of a coil form assembly 60 constructed in accordance with this invention significantly reduces the error rate over a rotor speed range from four revolutions per second to one revolution per second.

These particular graphs are representative of a test that is produced with a 1,200 turn coil 64. In Graph A, the coil was wound on a conventional coil form assembly of an insulation material and Graph B depicts the test results when the coil 16 is wrapped about a 65 mil thick copper core 61 having 15 mil thick end plates 62 and 63. Experimentation has shown that the phase shift is more responsive to changes in the thickness of the copper core 61 than it is to the end plates 62 and 63. Thus additional corrections can be achieved by changing the thickness of the core.

In summary, there is disclosed a copper coil form assembly that acts as a shorted turn and introduces correcting relative phase shifts into the timing signals of a restrained reaction turbine flowmeter, especially at low rotor speeds. As a result, the flowmeter produces more accurate indications of flow rate over a wider range of operating conditions. While a specific embodiment of a particular sensing coil form assembly has been disclosed, it is the object of the appended claims to cover all such variations and modifications as come within the true spirit and scope of this invention.

What is claimed as new and desired to be secured by Letters Patent of the United States is:

1. In a mass rate of flow meter including a housing means for defining a passage for a fluid, swirl generator means, unrestrained rotor means and restrained turbine means axially displaced along a first longitudinal axis extending (through) along the housing means, first sensing means including magnetic means at a predetermined point on the rotor means and magnetic flux sensing means located on said housing for producing a first pulse when said magnetic means comes into flux exchange relationship with said magnetic flux sensing means and second sensing means for detecting the passage of another predetermined point on the rotor means past a predetermined point on the turbine means, including a further magnetic means and a further magnetic flux sensing means for producing a second pulse when the magnetic means in said second sensing means comes into flux exchange relationship with said further flux sensing means, the interval between said first and second pulses being a measure of the mass rate of fluid flow, the improvement comprising means for compensating for any phase shift in said second pulse due to eddy currents in said housing when the magnetic means in said sensing means comes into flux exchange relationship with said further magnetic flux sensing means including, means for shifting the phase of said first pulse by an amount equal to any eddy current induced phase shift in said second pulse including an electrically shorted turn associated with the magnetic flux sensing means in said first sensing means.

2. A mass rate of flow meter as recited in claim 1 wherein said support means includes
   i. a hollow core composed of a non-magnetic, electrically conductive material, and
   ii. an end plate affixed to each end of said core and composed of a nonmagnetic, electrically conductive material, said coil being wrapped about said core between said end plates.

3. A mass rate of flow meter as recited in claim 2 wherein said nonmagnetic, electrically conductive material is copper.

4. A mass rate of flow meter as recited in claim 2 wherein said flowmeter additionally comprises magnetic core means composed of a permeable material disposed in said hollow core.

5. A mass rate of flow meter as recited in claim 1 wherein the magnetic flux sensing means and the shorted turn associated therewith in the first sensing means comprises:
   A. Non magnetic, electrically conductive support means disposed on the periphery of the housing with a second longitudinal axis that is transverse to the first longitudinal axis and that passes through the magnetic means, and,
   B. A coil on said support means about the second longitudinal axis.

6. A mass rate of flow meter comprising:
   A. A housing means for defining a passage for fluid along a first longitudinal axis and including an input port and an exit port,
   B. Swirl generator means affixed to said housing having its axis on said first longitudinal axis and positioned adjacent to said input port for imparting a constant, angular velocity to fluid entering said housing,
   C. Unrestrained rotor means axially displaced from said swirl generator means for rotating in response to the angular velocity of the fluid passing through said housing, said rotor means including first and second magnetic means located at first and second predetermined points on said rotor that are axially and circumferentially displaced with respect to each other,
   D. Restrained turbine means spaced axially from said rotor means and having a magnetically permeable blade means affixed at a predetermined position on said turbine means, said blade means being closely coupled to said second magnetic means when the second predetermined point on said rotor means passes said blade means,
   E. First sensor means mounted on said housing at a predetermined location for sensing the passage of the first predetermined point on the rotor means and producing a first pulse; in response thereto,
   F. Second sensor means mounted on said housing coaxially with said turbine and axially coextensive with at least a portion of said turbine means, said second sensor generating a second pulse each time the second predetermined point on said rotor means passes the predetermined position on said turbine means, the interval between said second and first pulses being a measure of the mass rate of flow,
   G. Means for compensating for any phase shift in said second pulse including means for shifting the phase of said first pulse by an amount equal to any phase shift in said second pulse.

7. A mass rate of flow meter as recited in claim 1 wherein said support means includes:
   a. a hollow coil form core composed of a non-magnetic, electrically conductive material, and
   ii. an end plate affixed to each end of said core and composed of a non-magnetic, electrically conductive material, said coil being wrapped about said core and between said end plates.

8. A mass rate of flow meter as recited in claim 7 wherein said non-magnetic, electrically conductive material is copper.

9. A mass rate of flow meter as recited in claim 7 wherein said flowmeter additionally comprises magnetic core means composed of a permeable material disposed in said hollow core.

10. A mass rate of flow meter as recited in claim 9 wherein said first sensing means additionally includes permeable cover means mounted to said housing and surrounding said first sensing means.

11. A mass rate of flow meter as recited in claim 10 wherein said coil form core additionally includes magnetic core means in magnetic circuit with said cover means.

12. A mass rate of flow meter as recited in claim 6 wherein said first sensor has a shorted turn associated therewith which includes;
   i. Non-magnetic, electrically conductive support means with a second longitudinal axis that is transverse to the first longitudinal axis and that passes through said first magnetic means, and
   ii. Coil means coaxial with the second longitudinal axis on said support means.

* * * * *